United States Patent

[11] 3,560,816

| [72] | Inventor | Sigfrid Franzen<br>Vasteras, Sweden |
|---|---|---|
| [21] | Appl. No. | 767,395 |
| [22] | Filed | Oct. 14, 1968 |
| [45] | Patented | Feb. 2, 1971 |
| [73] | Assignee | Allmanna Svenska Elektriska Aktiebolaget<br>Vasteras, Sweden<br>a Swedish corporation |
| [32] | Priority | Oct. 17, 1967 |
| [33] | | Sweden |
| [31] | | 14,171/67 |

[54] DRIVING SYSTEM FOR TRACTION PURPOSES
4 Claims, 2 Drawing Figs.

[52] U.S. Cl....................................... 318/52,
 318/355
[51] Int. Cl....................................... H02p 7/70

[50] Field of Search............................ 318/52,
355, 530, 525, 526

[56] References Cited
UNITED STATES PATENTS

| 2,811,685 | 10/1957 | Hoffer............... | 318/355 |
| 3,060,602 | 10/1962 | Buttenhoff......... | 318/52UX |
| 3,130,805 | 4/1964 | Carter............... | 318/52X |
| 3,267,345 | 8/1966 | Boening............. | 318/52 |

*Primary Examiner*—Oris L. Rader
*Assistant Examiner*—Thomas Langer
*Attorney*—Jennings Bailey, Jr.

ABSTRACT: An electrical traction system with parallel-connected groups of series motors is provided with means for switching over to a condition with a constant number of field ampere turns when maximal adhesion is desired.

PATENTED FEB 2 1971

3,560,816

INVENTOR.
SIGFRID FRANZEN

BY
Jennings Bailey

DRIVING SYSTEM FOR TRACTION PURPOSES

BACKGROUND OF THE INVENTION

1. Field of the Invention

The present invention relates to a driving system for traction purposes comprising several direct current motors mechanically connected to different wheel axles, their rotors being parallel-connected or evenly distributed in a number of parallel-connected groups, each group comprising several series-connected rotors.

2. Description of the Prior Art

Such driving systems are known, among other things, in electrical locomotives. Normally the motors are series motors, which is necessary if an even load distribution is to be obtained between the parallel connected groups without the use of special auxiliary means. In a known diesel-electric driving system separately excited motors are used and two parallel-connected rotor groups. Even load distribution between the groups is achieved by supplying the groups with excitation current from individual regulators which are connected to a comparison device for the rotor currents of the groups and dimensioned for the total excitation requirement of the group. Each group comprises two rotors, each with its own field winding, and the two field windings of the group are series connected to each other. The main purpose of the regulators in this case, however, is to obtain a system which offers optimal working conditions for diesel engines.

Known investigations of the adhesion conditions of electric locomotives have shown that the maximum driving power which can be transmitted between a driving wheel and rail is dependent on the torque speed curve of the driving motors and is achieved at a certain optimum slipping in this respect. It has been found that a situation where the slipping reaches at the most said optimum valve—which is very low—is most easily achieved if the torque speed curve of the driving motor shows relatively little speed increase when the torque decreases. Consequently shunt motors or separately excited motors should be used when it is only a question of transmitting as great a driving power as possible between a wheel and rail. However, the load distribution must also be taken into consideration between the various motors of the vehicle and when these are distributed in several parallel-connected groups it is commonly accepted that even load distribution—due to differences in wheel diameter and motor air gap—can only be obtained when series motors are used, unless special load distribution regulators are used.

SUMMARY OF THE INVENTION

When developing a driving system according to the invention it has been found that entirely acceptable load distribution between parallel-connected, separately excited groups can be obtained as long as the motor speed is below a certain, relatively low value, so that the supplied voltage is substantially balanced by the voltage drop over the rotor winding, whereas the electromotoric power of the motor is of little importance. Said value corresponds in electric locomotives to a travelling speed of approximately 10 percent of the maximum speed of the locomotive. The above observations have been related to the fact that said increased adhesion power arising at a certain slipping is not normally necessary or ought not to be used except at starting and low speeds. With particularly difficult adhesion conditions—which normally only occur sporadically, for example when the rails are dirty—it is possible, by utilizing said increase, to drive the train with low speed until the adhesion conditions have improved.

A driving system according to the invention is characterized in that the motor poles are arranged to be successively excited with a constant number of ampere turns or with a number of ampere turns substantially proportional to the rotor current, the first alternative being intended for starting and relatively low speeds.

According to a particularly advantageous embodiment of the invention one type of excitation is effected by driving the motors in the normal way as series motors and the other by supplying the series-connected field windings within a parallel group with an additional current from a regulator which supervises the total current through the series windings of the parallel-connected rotor group to ensure that this remains constant.

The choice of type of excitation can be made automatically, the necessary switching being dealt with by a contactor, the operating circuit of which is connected to a speed dependent voltage source, for example a tachometer-generator, or a centrifugal switch can be used.

BRIEF DESCRIPTION OF THE DRAWING

In the following the invention will be described with reference to the accompanying drawings in which.

DESCRIPTION OF THE PREFERRED EMBODIMENTS

Figure 1:
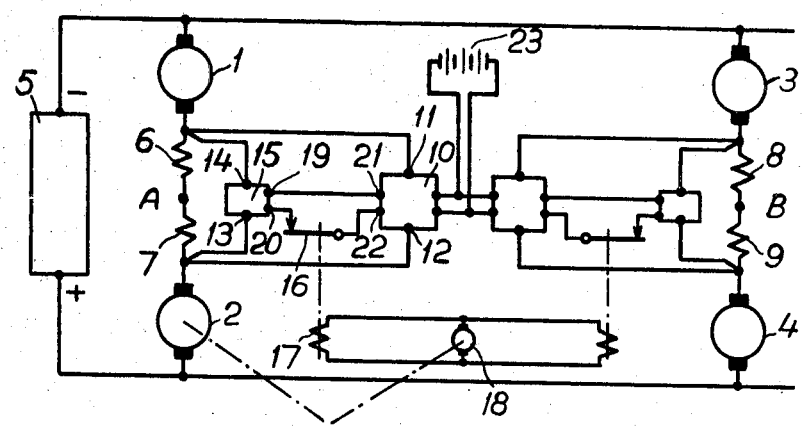
FIG. 1 shows four direct current motors intended to drive individual wheel axles of an electric locomotive.
Figure 1A:
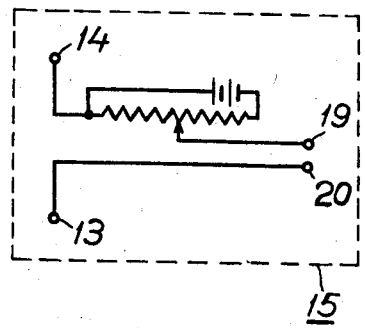
FIG. 1a shows in detail a part of FIG. 1.

The four direct current motors are distributed in two parallel-connected groups A and B and series connected within each group. The groups A and B are connected to a direct current generator or to the direct current side of a controlled rectifier 5. The four rotors are designated 1, 2, 3, 4 and the corresponding series windings 6, 7, 8, 9. The groups A and B are similar, also with regard to equipment connected for additional numbers of ampere turns, and only group A is therefore described in the following. The two series windings 6 and 7 are arranged immediately adjacent and together connected to the output side of a controlled current source 10, the output terminals 11 and 12 of which are connected to the ends of the series windings 6 and 7 which are not connected to each other. The series windings are also connected to the input terminals 13 and 14 of a comparison device 15, the output terminals 19 and 20 of which are connected to the input terminals 21 and 22 respectively of the control current source 10 (supplied by current source 23) by means of the relay contact 16. In the device 15 the voltage drop over the series windings 6 and 7 is compared with a constant reference value. As soon as the number of ampere turns of the series-windings 6 and 7 tends to deviate from a constant number of ampere turns preset by a suitable choice of the reference value, the current source 10 delivers an additional current which flows through the series windings 6 and 7 with such a current direction that the deviation is counteracted. A tachometer-generator mechanically connected to the rotor 2 is designated 18. When the speed of the motors exceeds a value corresponding to a travelling speed of approximately 10 percent of the maximum speed. The connection is broken between the comparison device 15 and the controlled current source, by the relay contact 16 being opened, which occurs when the current delivered to the relay coil 17 from the tachometer-generator 18 exceeds a certain value. The extra excitation is thus cut off and the motors 6 and 7 operate as series motors only.

A driving system according to the invention can of course also be made having special auxiliary windings for the extra excitation. This would, however, reduce the space for the series winding of the motor. Also, such an embodiment would require dismantling and rewinding of the motors when a conventional system is to be replaced by one according to the invention. With the embodiment according to the drawing, such a modernization can be effected without dismantling the motors. Since the controlled current source 10 only needs to cover a small portion of the excitation requirement, the necessary control equipment can be manufactured at considerably lower cost than corresponding equipment in the driving system described in the introduction having separately excited motors.

In the above the invention is mainly described in connection with electric locomotives. The system described, however, can be used with equally great advantage for vehicles which do not run on rails, for example diesel-electric trucks.

I claim:

1. Driving system for traction purposes comprising a plurality of direct current motors mechanically connected to different wheel axles, the motors being divided into parallel-connected groups, each group comprising at least one rotor and being provided with means to excite the motor poles selectively with a constant number of ampere turns or with a number of ampere turns substantially proportional to the rotor current, the excitation with a constant number of ampere turns being intended for starting and relatively low speeds.

2. Driving system according to claim 1, in which there are at least two motors in each group and the field windings of the motors of each of said groups are series connected with each other and with the rotors of the group, and wherein said selective exciting means comprises a controllable current source, and means to connect said current source to said series-connected windings for additional excitation at starting and low speeds, the control magnitude of the current source consisting of the difference between a reference value and a magnitude which is proportional to the current through the field windings.

3. Driving system according to claim 1, in which said selective exciting means comprises a tachometer means responsive to the speed for switching between the two excitation alternatives of the system.

4. Driving system according to claim 1 in which each motor comprises a rotor and a field winding series connected therewith, wherein said selective exciting means comprises a controllable current source and means to connect said current source across said field winding, for additional excitation at starting and low speeds, the control magnitude of the current source consisting of the difference between a reference value and a magnitude which is proportional to the current through said field winding.